Jan. 1, 1952 D. C. WARREN 2,580,626
FLUID HANDLING SWIVEL JOINT
Filed Sept. 29, 1947
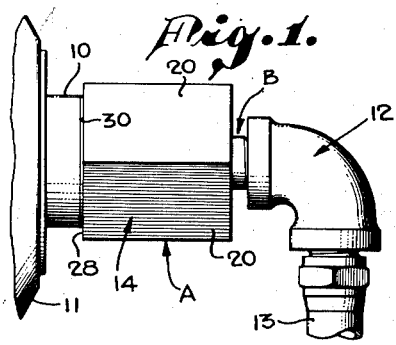
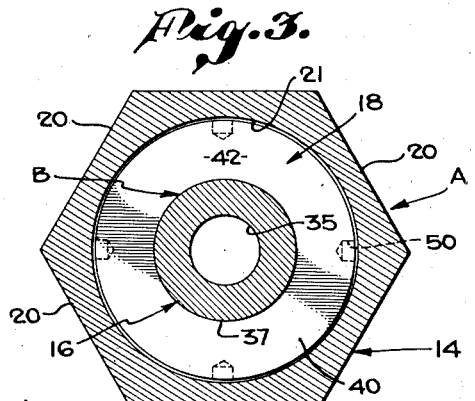
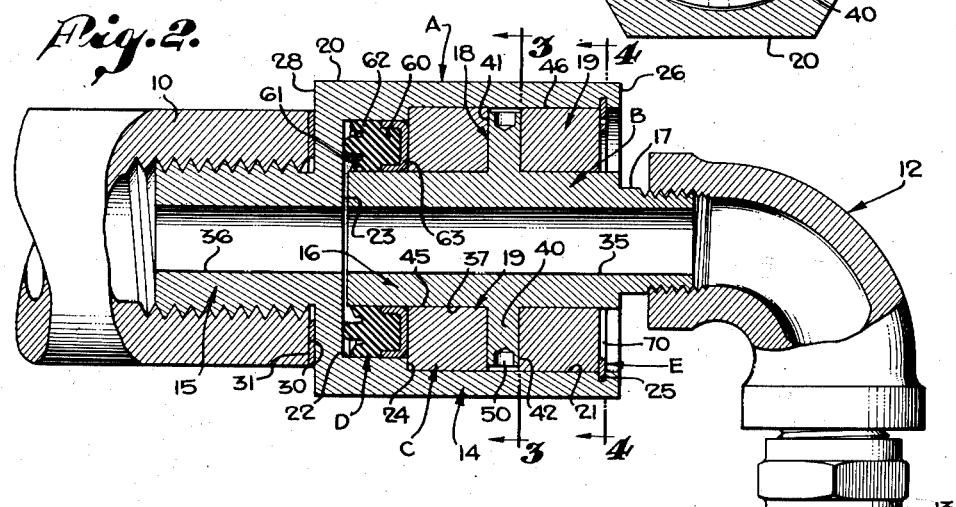
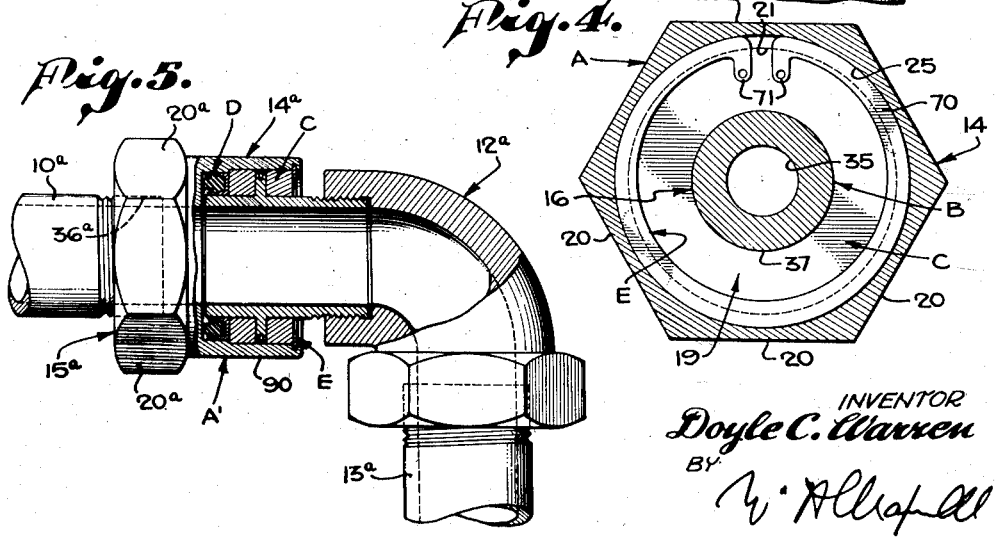
INVENTOR
Doyle C. Warren
BY
ATTORNEY Patented Jan. 1, 1952

2,580,626

UNITED STATES PATENT OFFICE 2,580,626

FLUID HANDLING SWIVEL JOINT

Doyle C. Warren, Monrovia, Calif., assignor to Chiksan Company, Brea, Calif., a corporation of California Application September 29, 1947, Serial No. 776,653

11 Claims. (Cl. 285—97.5)

This invention relates to a fluid handling swivel joint and it is an object of the invention to provide a simple, effective, inexpensive joint that will handle fluid without leakage and which will withstand continued use with a minimum of care or attention.

There are various situations where swivel joints are required to handle fluids and where it is desirable that such devices be of simple, inexpensive construction. For example, in the case of domestic washing machines water must be handled and it is most advantageous that it be handled through a simple, dependable swivel conection.

It is an object of my present invention to provide a simple, swivel joint for the general class of use indicated, and which involves a simple packing located in a most advantageous position and which further involves simple inexpensive bearing elements that are effective in maintaining the working parts in proper alignment and in taking both radial and axial thrust.

Another object of the invention is to provide a structure of the general character referred to that is simple and compact and which is free of parts difficult to make or assemble.

The various objects and features of my invention will be fully understood from the following detailed description of typical preferred forms and applications of the invention, throughout which description reference is made to the accompanying drawings, in which:

Fig. 1 is a side elevation of a typical device embodying my present invention showing it in a typical application. Fig. 2 is an enlarged longitudinal sectional view of the structure provided by the present invention showing it combined with the parts illustrated in Fig. 1. Fig. 3 is a transverse sectional view taken as indicated by line 3—3 on Fig. 2. Fig. 4 is a transverse sectional view taken as indicated by line 4—4 on Fig. 2, and Fig. 5 is a side elevation of a modified form of construction embodying the present invention, parts of the structure being broken away to show in section.

Referring first to the form of the invention illustrated in Figs. 1 to 4 of the drawings the structure provided by my invention involves, generally, a body A, a core B, bearing means C, sealing means D, and a single retaining means E serving to maintain the other parts in coupled working relationship. In the application shown in the drawings the body A is applied to a tubular shaft 10 which may be an element of a washing machine 11 or the like. In this case the core B is shown provided with or carrying a fitting 12, the particular fitting illustrated being a simple L to which a fluid conduit 13 may be connected.

In accordance with the general construction of the present invention the body A is formed of or is characterized by a case 14 and a stem 15. The case carries the elements B, C, D and E while the stem serves as a means of coupling the body to parts such as the shaft 10. The core B is formed of or is characterized by a spindle portion 16, a nipple portion 17 that projects from the spindle and serves as a coupling by which connection is made with a fitting 12 or the like. The bearing means involves or is characterized by a radial flange 18 on the spindle within the case of the body and like simple bearing rings 19 on the spindle at opposite sides of the flange. The sealing means D is located at the innermost part of the case 14 between the bottom of the case and the innermost bearing ring and seals between the spindle 16 and the case 14. The single retaining means E is preferably a simple split ring or snap ring applied to the outer end portion of the body immediately outward of the outermost bearing 19 and serve to retain the several parts in operating connection with the case.

The body A is preferably formed of bar stock such as hexagonal or other polygonal stock with the result that it has a polygonal exterior presenting a plurality of flat sides 20. In the case illustrated in Figs. 1 to 4 the flat sides 20 of the body 14 extend continuously from one end of the body to the other.

The case portion 14 of the body A is of such length and size as to accommodate the sealing means D, bearing means C and it carries the retainer E. The case 14 is characterized by a central longitudinal bore or opening 21 that enters the case from its outer end and it has a reduced counterbore 22 at the inner end of the bore 21 and continuing to the bottom 23 of the case opening. The counterbore 22 is somewhat smaller than the bore 21 and an outwardly facing shoulder 24 is established in the case 14 where the bores join. An annular recess 25 is provided in the wall of bore 21 near the outer end 26 of the case, which recess carries the retainer as will be hereinafter described.

The stem 15 in the case under consideration is considerably smaller in diameter than the case 14 with the result that there is a large, flat inner end 28 on the case lying in a plane normal to the longitudinal axis of the structure. The stem 15 is in the nature of an extension projecting from the case to serve as a coupling for joining the case to a part such as a pipe or a shaft. In the case illustrated the stem is externally threaded and engaged in a threaded opening in the shaft 10. The end 30 of shaft 10 is flat and normal to the axis of the shaft, and a washer 31 is interposed between the end 30 of the shaft and the inner end 28 of the case, establishing a tight connection between the case and the shaft.

The core B may be a very simple element involving merely the spindle 16 and nipple or coupling part 17. The spindle 16 is shown as a simple tubular part having a central opening or bore 35 coresponding in size and registering with an opening 36 in the stem 15. The exterior 37 of the spindle is a plain turned surface carrying the packing D and the bearing means C as will be hereinafter described. The coupling part 17 is shown as a projection on the outer end of the spindle 16 and in the case illustrated it is externally threaded to receive the fitting 12 shown in the drawings as a simple L-fitting. It is to be observed that through a structural feature of the present invention the fitting 12 may be applied to the coupling 17 so that the fitting closely approaches or is immediately adjacent the outer end 26 of the case 14, it being unnecessary to leave space between the fitting and the case to accommodate a wrench or the like as is ordinarily the case in structures of this general character.

The bearing means C is characterized by a single radial flange 40 projecting from the exterior of the spindle 16 intermediate its ends and like bearing rings 19 on the spindle at opposite sides of the flange. The flange 40 is fixed or rigid with the spindle and may be integrally formed therewith as shown in the drawings. In the preferred form the flange has a flat inner end face 41 against which the inner bearing ring seats and has a flat outer end face 42 against which the outer bearing ring seats.

The bearing rings 19 are preferably alike and are simple annular members rectangular in cross sectional configuration and may, in practice, be formed of oil impregnated material or the like or any suitable bearing material. The bore 45 of each bearing ring snugly receives the spindle while the outer surface 46 of each bearing ring has bearing engagement in the bore 21 of the case 14. The ends of the rings are flat parallel co-planar surfaces. The inner end of the inermost ring 19 seats on the shoulder 24 in the case while its outer end seats against the flange 40. The inner end of the outermost ring fits against the flange 40 while its outer end is engaged by the retainer E.

A feature of my construction is the provision or formation of the flange 40 with parts or surfaces to be engaged by a tool such as a wrench so that before the core is assembled into the body the core can be applied in the desired manner to the fitting 12. In the case illustrated a plurality of peripheral sockets 50 are provided in the flange 40 suitable for engagement by a spanner wrench or the like.

The sealing means D is, in accordance with my arrangement, located between the inner end of the innermost packing ring and the bottom 23 of the opening provided in case 14, and it engages between the spindle 16 and the counterbore 22 to seal between the spindle and the case. In the construction illustrated the sealing means involves a packing assembly characterized by a packing ring 60 with lips 61 and 62 engaging the spindle and counterbore respectively. The packing assembly further involves a ring holder 63 which maintains the sealing ring in proper operating position.

The retaining means E preferably comprises a single element in the form of a simple snap ring 70 engageable in recess 25 to have an inner peripheral portion projecting from the bore 21 to overlie a part of the outermost bearing ring 19 and thus retain this ring against outward movement in the bore 21. In the particular case illustrated the ring 70 is shown with inwardly turned end parts 71 provided with suitable openings facilitating simple operation of the ring.

In the form of the invention illustrated in Fig. 5 the case 14$^a$ of body A' is combined with the coupling part 15$^a$ so that the coupling part is not in the form of a reduced externally threaded stem but rather is in the form of a somewhat enlarged polygonal part with a threaded opening 36$^a$ receiving the end of a pipe 10$^a$ or the like. When this form of the invention is employed the exterior 90 of the case 14$^a$ may be turned or round, it being convenient to form the exterior of the part 15$^a$ so that it is polygonal or has flat sides 20$^a$ as clearly shown in the drawings. It is to be observed that in employing this form of the invention the body A may be advantageously formed of bar stock, but instead of leaving the exterior of the stock in its original state the bar is turned down to establish the round case portion 14$^a$. The interior of the construction may be otherwise the same, that is, the packing means D, bearing means C and retaining means E may be the same as above described. In the drawings the fitting 12$^a$ shown carried by the coupling part of the core is somewhat different in design from that shown in Figs 1 and 2 and is employed to cary a fluid conduit 13$^a$.

With the construction that I have provided the several parts or essential elements are simple in form and construction and can be very easily and quickly assembled. In assembling the construction the outermost bearing ring is applied to the spindle of the core and the core is then applied to the fitting 12 whereupon the various other parts are assembled and when the assembly is completed within the case the retainer E is applied. Through this construction the fitting 12 may be arranged to closely approach the end of the case 14 providing a closely coupled construction and the structure is free of parts or devices requiring adjustment or operation or subject to being inadvertently operated. The only part accessible for operation is the split ring of means E, this being the sole part controlling the entire assembly of working elements.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A fluid handling device of the character described including, a unitary tubular body having a case round in cross section and a stem substantially smaller in diameter than the case and projecting from the inner end of the case, the case having a bore entering it from the outer end where the case is open and terminating at a shoulder in the case, a core engaged in the case through the open outer end thereof and having a spindle within the bore of the case and a coupling part projecting from the spindle and beyond the outer end of the case, bearing means including a radial flange on the spindle intermediate its ends and two like bearing rings separate from the body and from the spindle and located on the spindle, there being a ring at each side of the flange, each ring bearing in the bore and against the flange, and sealing means between the spindle and case engaging the innermost ring and the shoulder.

2. A fluid handling device of the character described including, two unitary elements, one a tubular body having a cylindrical case with a permanent shoulder at its inner end and a stem smaller in diameter than the case and projecting from the inner end of the case, the case having a bore entering it from the outer end and being open at its outer end, the other element being a core having a spindle within the case and opposing the shoulder and a coupling part projecting from the spindle and beyond the outer end of the case, bearing means engaged in the body from the outer end thereof and including a radial flange fixed on the spindle intermediate its ends and like bearing rings separate from the body and from the spindle and carried on the spindle, there being a ring engaging at each side of the flange and bearing in the bore, sealing means between the spindle and case and sealing with the innermost ring and the shoulder, and a retainer ring separable from the body and engaged in the bore at the outer end portion thereof and engaging and retaining the outermost bearing ring in the bore.

3. A fluid handling device of the character described including, two unitary elements, one a tubular body having a cylindrical case and a stem smaller in diameter than the case and projecting from the inner end of the case, the case having a bore entering it from the outer end and having a reduced portion forming an outwardly facing shoulder and having a flat bottom, the other element being a core terminating in the case and having a spindle portion confined within the case with its inner end opposing the bottom, the core having a coupling part projecting from the spindle and beyond the outer end of the case, bearing means including a radial flange fixed on the spindle intermediate its ends and like bearing rings on the spindle one engaged with each side of the flange and each bearing in the bore, sealing means including an annular seal confined between the innermost ring and the bottom and sealing between the case and the core of the spindle where the core terminates in the case, and a split ring engaged in the outer end portion of the bore retaining the bearing means in the bore, the innermost bearing ring being engaged with said shoulder.

4. A fluid handling device of the character described including, two unitary elements, one a straight tubular body having a cylindrical case with a polygonal exterior and an externally threaded stem projecting from the inner end of the case coaxially therewith, the case having an axial bore uniform in diameter and entering it from the outer end, the other element being a straight tubular core having a spindle confined to and terminating within the case and an externally threaded coupling part projecting from the spindle and beyond the case through the outer end thereof, bearing means including a radial flange fixed on the spindle intermediate its ends and two like bearing rings on the spindle one engaged with each side of the flange, each ring having its inner periphery engaged on the core and its outer periphery engaged in the bore, and sealing means between and engaged with the spindle and case at the innermost ring.

5. A fluid handling device of the character described including, two unitary elements, one a straight tubular body having a cylindrical case and a threaded stem concentric with the case and projecting from the inner end of the case, the case having an axial bore entering it from the outer end, the other element being a straight tubular core having a spindle confined within the case and a coupling part projecting from the spindle and beyond the case from said outer end thereof, bearing means including a radial flange on the spindle intermediate its ends and like solid bearing rings on the spindle engaging the sides of the flange and bearing in the bore, and sealing means between the spindle and case at the innermost ring, the stem being smaller in diameter than the case and the case having a shoulder at its inner end normal to the longitudinal axis of the body to receive a washer for sealing with a part engaged with the stem.

6. A fluid handling device of the character described including, two unitary elements, one a tubular body having a cylindrical case and a stem projecting from the inner end of the case, the case having a bore of uniform diameter entering it from the outer end and having a reduced counterbore continuing from the inner end of the bore forming an outwardly facing shoulder in the case, a core terminating in the counterbore and having a spindle portion within the case and a coupling part projecting from the spindle and beyond the case from said outer end thereof, bearing means engaged in the bore from the outer end of the case and confined in the bore including, a radial flange fixed on the spindle intermediate its ends and two like bearing rings on the spindle one bearing on each side of the flange and bearing in the bore, the innermost bearing ring being supported by the shoulder and sealing means in the counterbore engaging the core where it terminates in the case.

7. A fluid handling device of the character described including, two unitary elements, one a tubular body having a cylindrical case and a threaded stem projecting from the inner end of the case, the case having a bore entering it from the outer end and terminating in the case, the other elements being a straight tubular core having a round spindle terminating within the case and a round threaded coupling part coaxial with the spindle and projecting from the spindle and beyond the outer end of the case, bearing means including a radial flange on the spindle intermediate is ends and normally housed by the case and like bearing rings on the spindle at each side of the flange and bearing in the bore, and sealing means between the spindle and case at the innermost ring, the flange having wrench engaging parts to facilitate application of the stem to a fitting or the like.

8. A fluid handling device of the character described including, two unitary elements, one a straight tubular body having a cylindrical case and a threaded stem concentric with the case projecting from the inner end of the case, the case having a polygonal exterior and a bore uniform in diameter and entering it from its outer end and a reduced counterbore at the inner end of the bore, the stem being smaller in diameter than the case and the inner end of the case being flat and in a plane normal to the longitudinal axis of the body forming a washer receiving shoulder at the inner end of the case, the other element including a tubular core with its inner end terminating in the case, the core having a spindle confined within the case and an externally threaded nipple projecting from the outer end of the spindle and beyond the outer end of the case, bearing means including, a radial flange fixed on the spindle intermediate its ends and two like bearing rings on the spindle one at each side of the flange and each carried in the bore, sealing means in the counterbore directly engaging the innermost ring and sealing with the case and with the spindle where the core terminates in the case, and a split ring engaged in the outer end portion of the bore directly engaging the outermost ring in the bore holding the bearing means in the bore.

9. In combination, a straight tubular shaft, a body having an elongate cylindrical case in line with the shaft and a stem projecting from the inner end of the case and threaded into one end of the shaft, a washer sealing between one end of the case and said end of the shaft, a core carried by the body including a spindle confined within the case to rotate therein and a threaded nipple projecting from the spindle and beyond the other end of the case, bearing means on the spindle engaging the case, sealing means in the case at the inner end of the bearing means sealing between the spindle and case, and a fitting carried on the nipple.

10. In combination, a straight tubular shaft, an elongate tubular body having a cylindrical case and a stem projecting from the inner end of the case and threaded into the shaft, a washer sealing between the shaft and one end of the case, a core carried by the body including a spindle confined within the case to rotate therein and a threaded nipple projecting from the spindle and beyond the other end of the case, bearing means on the spindle engaging the case including a flange fixed on the spindle having wrench engaging parts and two bearing rings on the spindle one at each side of the flange and bearing in the case, sealing means in the case at the inner end of the bearing means sealing between the spindle and case, and a fitting carried on the nipple.

11. In combination, a straight tubular shaft with a flat end face, an elongate tubular body having an elongate case with a flat face at one end and a threaded stem projecting from the said end of the case and threaded into the shaft, the case having a bore entering it from the other end and a counterbore at the inner end of the bore, a washer sealing between the face of the case and the face of the shaft, a core carried by the body terminating in the body and including a spindle confined within the case to rotate therein and a threaded nipple projecting from the spindle and from the bore of the case, bearing means on the spindle engaging the case including a flange fixed on the spindle having wrench engaging parts and two like bearing rings on the spindle one bearing on each side of the flange and each bearing in the bore of the case, sealing means in the counterbore of the case at the inner end of the bearing means sealing between the spindle and case, a split ring retaining the bearing means in the case, and a fitting carried on the nipple.

DOYLE C. WARREN.

REFERENCES CITED

The following references are of record in the file of this patent:

UNITED STATES PATENTS

| Number | Name | Date |
| --- | --- | --- |
| Re. 18,296 | Pierce | Dec. 22, 1931 |
| 134,195 | Condon et al. | Dec. 24, 1872 |
| 1,093,528 | Bowles | Apr. 14, 1914 |
| 1,208,002 | Queenan et al. | Dec. 12, 1916 |
| 1,902,697 | Ellingsen | Mar. 21, 1933 |
| 2,052,108 | Okner et al. | Aug. 25, 1936 |
| 2,066,711 | Banks | Jan. 5, 1937 |
| 2,279,969 | Casperson | Apr. 14, 1942 |

FOREIGN PATENTS

| Number | Country | Date |
| --- | --- | --- |
| 150,314 | Great Britain | Mar. 31, 1921 |